July 26, 1960 S. S. BROWN 2,946,870
THEFT ALARM SYSTEM
Filed June 10, 1958 2 Sheets-Sheet 1

INVENTOR:
SAM S. BROWN
BY:
Green, McCallister & Miller
HIS ATTORNEYS.

INVENTOR:
SAM S. BROWN

United States Patent Office 2,946,870
Patented July 26, 1960

2,946,870

THEFT ALARM SYSTEM

Sam S. Brown, 144 N. Dithridge St., Pittsburgh, Pa.

Filed June 10, 1958, Ser. No. 741,059

5 Claims. (Cl. 200—61.89)

This invention relates to an alarm system for motor vehicles such as automobiles and particularly, to a system that is operative when an unauthorized person sits in or moves toward the driver's seat or compartment.

Heretofore, alarm systems for automobiles and the like have been too complicated, on one hand, and subject to tampering on the other hand, while car thefts have continued to mount. I have developed a control system, apparatus or electrical layout which will normally be inoperative when an authorized driver is in the driver's seat, but which after a time delay period, will be unconsciously operated by an unauthorized person who operates a hidden pressure-sensitive control switch.

It has thus been an object of my invention to provide a new and improved form of alarm system, apparatus or electrical layout for motor vehicles;

Another object has been to devise an alarm system for warning of an attempted unauthorized use of a motor vehicle that will not be effected by a thief tampering with its ignition system;

A further object has been to devise an alarm system which will become effective when the ignition or another key-operated switch or control is locked or closed and which will be set into operation by the feet or weight of an unauthorized person entering or sitting in the driver's compartment;

A further object of my invention has been to devise a control system whose mechanism is connected to a source of energy when a dashboard switch or control is closed or connected, will be retained in such an operative relationship during the absence of the authorized driver or owner, and which has a time delay mechanism for sounding an alarm when an unauthorized person without a proper key enters the driver's position;

These and other objects of my invention will appear to those skilled in the art from the descriptive embodiment herein set forth.

Figure 1:
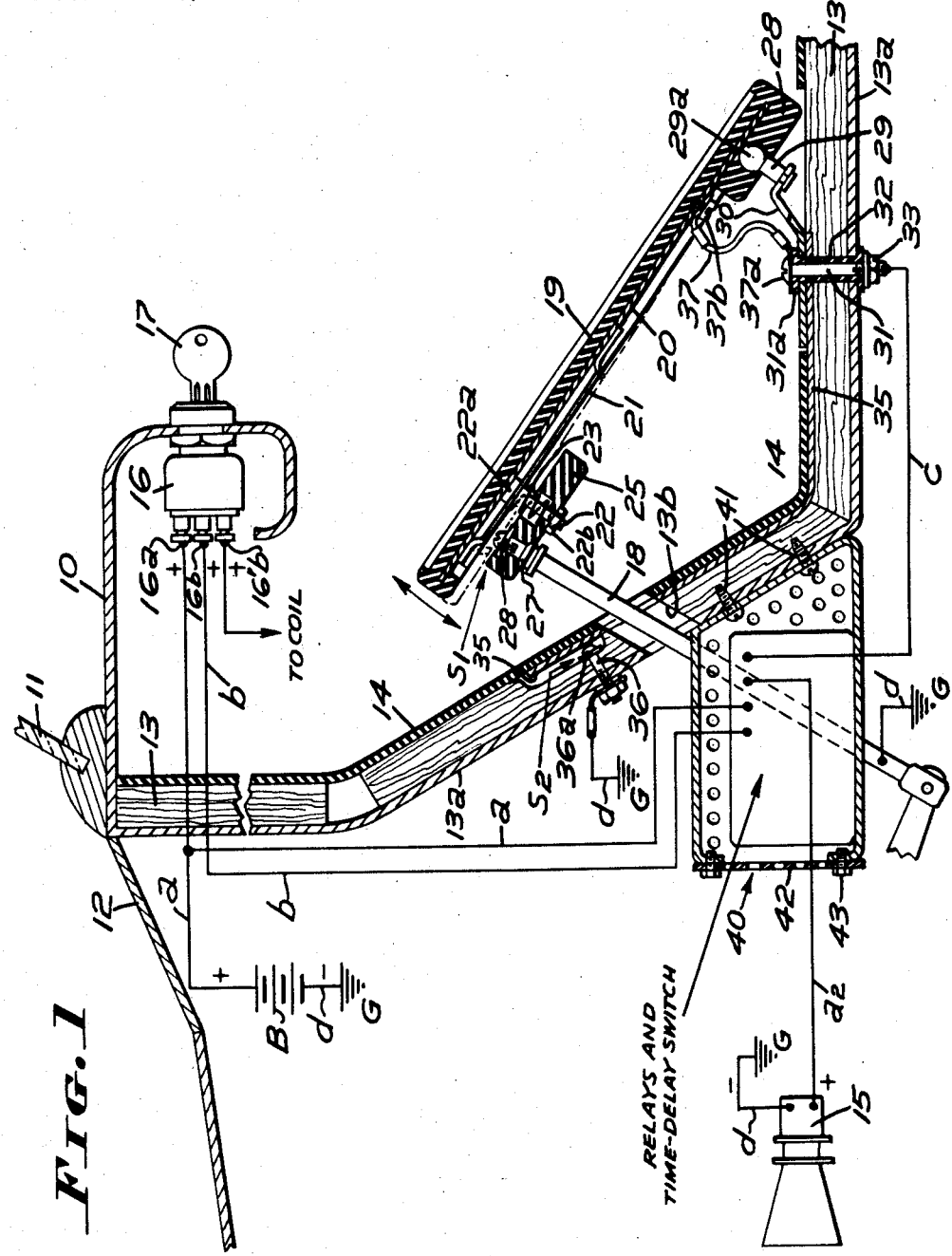
Figure 2:
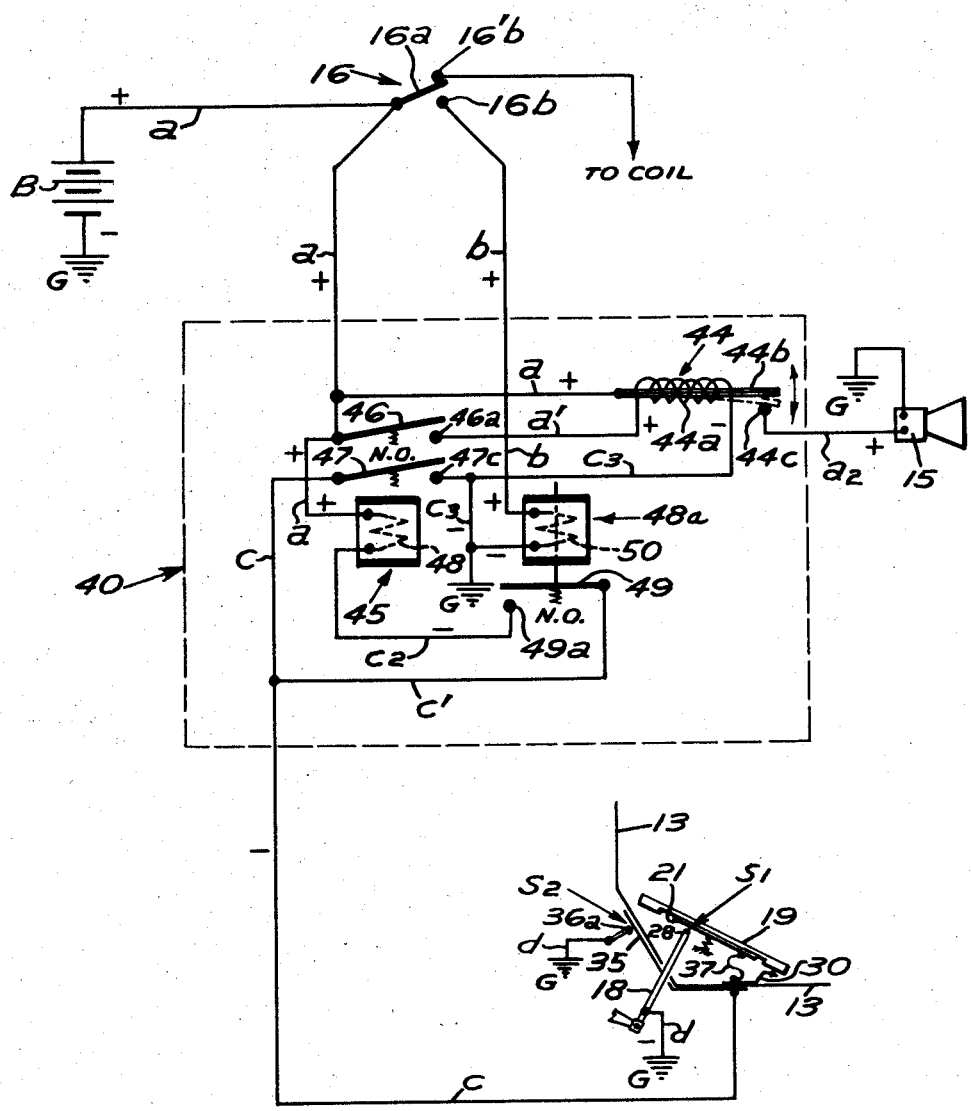

In the drawings, Figure 1 is a somewhat diagrammatic side view in sectional elevation through the front instrument panel and floor board portions of a vehicle showing a system of my invention in a mounted relationship;

And, Figure 2 is an electric circuit diagram illustrating the operating mechanism and connections of a system constructed in accordance with my invention.

In carrying out my invention, I utilize the energy from a conventional car or automobile battery and provide a dashboard switch or control which is either combined with the ignition switch or is a separate tumbler key switch that is closed when it is locked and the key is removed. At this time, the system is operative if and when one or more pressure-sensitive switches on or associated with the floor of the car, adjacent the driver's seat or the foot accelerator pedal, are momentarily depressed. The latter switches close the circuit to energize relays or solenoid-operated switches that energize a time delay mechanism to sound an alarm, as an ordinary horn, after a suitable time interval of, for example, 15 seconds. Such energization of the alarm part will continue until the system is de-energized by inserting the key and opening or disconnecting the switch.

Referring particularly to Figure 1 of the drawings, 10 indicates somewhat diagrammatically a dashboard of a vehicle which is located behind the windshield 11 and as an extension of the hood 12. A floor board portion 13 of wood construction is shown in its usual position in which it extends downwardly and forwardly from a position behind or at the back end portion of the panel 10 and is supported by a metal backing or floor plate or frame member 13a. As customary, a fabric or rubber, wear or facing pad 14 is laid over the floor 13 to extend therealong and cover it. A storage battery of a usual 6 or 12 volt type is indicated as B, and a conventional horn or alarm unit is indicated as 15. It will be noted that the battery B is connected in the usual manner on its negative side to the frame of a car as a ground (G) through lead or wiring d. Its positive side is shown connected by lead a to an arm or blade element or terminal 16a of switch 16 that is mounted on the dashboard 10.

The switch or control means 16, shown of a tumbler, key-operated type, has a switch arm or element 16a that may be opened or disconnected as to an alarm circuit contact point 16b (see Figure 2) and closed or connected as to an ignition coil circuit contact point 16'b by inserting and turning the key 17. When the key 17 is turned back and removed, the switch arm or element 16a is then in a closed position with the circuit contact 16b and in an open position as to the ignition contact point 16'b, such that line or lead b is now connected to the positive side of the battery B. At this time, operating elements of my system (relays and time-delay switch mechanisms) in box unit 40 are ready to operate if a pressure-sensitive switch $S_1$ or $S_2$ is closed. It may be noted that the switch contact 16'b and its connection to the automobile ignition coil may be eliminated, if the switch 16 is to be employed as an independent switch and a conventional, separate, ignition switch is to be employed.

The unit 40 has a metal housing whose sides are perforated for ventilation purposes, whose front end plate 42 is removably secured by bolts 43, and whose back end wall may be mounted, as by metal screws 41, to the underside of the metal floor plate member 13a. A connection lead $a^2$ is made from the unit 40 to the positive side of the alarm or horn unit 15 whose other side is connected to the ground G by lead d.

I have shown an accelerator pedal 19 of somewhat conventional construction that is provided with a metal backing plate 20 on its rubber-reinforced face. The plate 20, near its upper end portion, carries an integral, backwardly-projecting centrally-slotted or open, U-shaped slide-guide channel member 21 that is adapted to slidably receive a rounded guide head 22a of a bolt and nut assembly 22. The head 22a will slide along the internal track provided by the guide member 21 as the accelerator pedal 19 is raised and depressed to operate the gas feed of the vehicle. A plastic or hard rubber (dielectric) block element 25 carries the assembly 22 and a tension spring 23 which resiliently holds the head 22a in an operating position within the guide member 21.

An accelerator rod or shaft 18 extends through opening 13b in the floor construction and is provided with a plastic or rubber, securely-positioned, mounting collar 27, and a screw or bolt and washer assembly 28 for securely mounting its upper end portion on an upwardly-extending portion of the block element 25. It should be noted that the head of the assembly 28 forms one contact of one pressure-sensitive switch $S_1$ with the metal guide member 21 which is electrically connected through the plate member 20 to a negative electrical circuit lead c. As shown, the rod 18 is connected ot the ground G by lead d. The switch $S_1$ is closed or contact is made when foot pressure is exerted on the accelerator pedal 19 to form a closed circuit between the negative lead $c$ and the ground G.

As shown in Figure 1, the accelerator pedal 19 is shown positioned at its lower end on an upwardly-projecting metal bracket 30 which carries a mounting pin 29 whose rounded or ball-shaped head portion 29a has a ball and socket mounting within a hard rubber or plastic cross member 28. The member 28 is secured to the pedal 19 and constitutes an integral part thereof. This mounting permits the pedal 19 to be pivoted about the head 29 to permit it to be depressed and raised, as desired, in the conventional manner. The bracket 30 is secured on wood floor board 13 and in an electrically-insulated manner to the metal floor member 13a by a nut and bolt assembly 31 and 33 and a dielectric sleeve 32.

A flexible, thin-metal conductor arm, contact strip, plate or piece 35 extends from a position beneath the bracket 30, in an electrically-connected relation with it and a head portion 31a of bolt 31, along suitable reaches of the floor board assembly to form one contact of a second pressure-sensitive switch $S_2$. In this connection, it will be noted that the bolt 31 is connected to negative circuit lead $c$ to thus electrically connect the metal-contact piece 35 and the bracket 30 thereto. A flexible electrical cable 37 (see Figure 1) is connected at one end by means of a set screw 37a to the head 31a of the bolt 31 and, at its other end, by a set screw 37b to backing plate member 20. The member 20 thus electrically connects the channel member 21 to the circuit $c$ to provide one contact for the accelerator pedal switch $S_1$.

By way of example, I have shown the second or floor-pressure switch $S_2$ as mounted on the front portion of the floor to cooperate with a terminal head 36a of a bolt and nut assembly 36. The assembly 36 is electrically connected to lead $d$ and the ground G. Thus, a closing of either the first switch $S_1$ (provided by the foot pedal and the top end of the accelerator shaft 18) or the second switch $S_2$ (provided by the flexible metal underlining plate 35 and bolt and nut assembly 36) will provide a current-flow connection between the ground G and negative circuit lead $c$ to cause my system to become energized or actuated. One or more floor switches may be provided of the same general construction as $S_2$ at suitable strategic positions about the floor at the driver's seat location or driver's compartment, so that anyone sitting or standing in such a position will at least actuate one of the switches. When the circuit of lead $c$ is closed to the ground G, my unit 40 becomes operative and after a selected time interval, causes the actuation of a horn or alarm device 15.

Referring particularly to Figure 2 of the drawings, when the switch 16 is manually closed on contact 16b, it provides a positive current flow to the contact 16b to thus energize lead line $b$ and coil 50 of solenoid relay switch unit 48a. It will be noted that switch arm 49 of this unit 48a is normally open and is thus closed when the coil 50 is energized to make contact with point 49a (of the circuit lead $c^2$) to coil 48 of solenoid or relay switch unit 45. The two switch arms 46 and 47 of unit 45 are normally open and are only closed when the coil 48 is energized; such energization occurs when switch arm 49 of unit 50 is closed and one of the pressure switches $S_1$ or $S_2$ is closed to provide negative current flow from the ground G to circuit leads $c^1$ and $c^2$. It will be noted that the coil 50 of unit 48a is energized on its positive side by current flow from lead $b$ when contact 16b of the dashboard switch 16 is closed, and on its negative side by current flow from the ground G and lead $c^3$.

When manual pressure switch $S_1$ and $S_2$ is closed, the coil 48 of unit 45 is energized on its positive side by current flow from positive circuit lead $a$, and on its negative side by current flow from circuit leads $c$, $c^1$, switch arm 49, and circuit lead $c^2$. This causes switch arm 46 to close on contact 46 and provide a positive current flow from circuit lead $a$ to lead $a^1$, to the positive side of a heating coil 44a of a time delay switch unit 44 (shown of bi-metal switch arm type). This also simultaneously causes switch arm 47 to close on contact 47c and provide a negative current flow from the circuit ground G, lead $c^3$, contact 47c, switch blade 47, leads $c$ and $c^1$, switch blade 49, contact 49a and lead $c^2$ to continue the energization of coil 48 after the pressure switch $S_1$ or $S_2$ has opened. As a result, the heating coil 44a which is always connected to the negative circuit through lead $c^3$ and the ground G, will be energized on its positive current side through lead $a'$, contact 46a, switch arm 46 and lead $a$ when one of the pressure switches $S_1$ or $S_2$ is closed; it will continue to be thus energized after the pressure switches are again opened and until the blade or arm 16a of the tumbler or dashboard control or switch 16 is opened with respect to contact 16b. Thus, the horn or alarm unit 15 will continue to operate until such occurs, after unit 44 has once closed its contacts.

The time delay control or switch unit 44 can be set to close its contact arm or blade 44b on contact 44c at the end of any suitable time interval, such as 15 seconds of heating action of its coil 44a. Although a bi-metal type of unit 44 is shown for the purposes of simplicity and illustration, it will be apparent that a vacuum tube or other type may be used. After the contacts of the unit 44 are closed, they will remain closed until the heating coil 44a is de-energized.

When the driver or owner wishes to leave his car, then the dash board switch 16 is turned to a closed position as to contact 16b and the key 17 is removed, thus "setting" my system or making it ready for operation. At this time, the coil 50 of the relay switch unit 48a becomes energized and its switch arm 49 thus closes on switch contact 49a. As a result, the negative side of the coil 48 of the second relay switch or control unit 45 is connected through lead $c^2$, switch blade 49, contact 49a, and lead $c^1$ to pressure-switch-controlled negative current lead $c$. Thus, when a person sits in the driver's seat and operates one of the switches $S_1$ or $S_2$, he must insert the key 17 in and turn the switch 16 to an open position as to contact 16b within the time-delay period provided, as otherwise the alarm unit 15 will become energized and will sound until this is done by an authorized person, such as the owner of the car. As a result, the placing of a "jumper" by a thief across the ignition circuit, in order to start the motor and steal the car, will not prevent my apparatus from sounding and keep sounding an alarm.

What I claim is:

1. In an automobile theft alarm system wherein a source of electromotive force is connected to the system when the automobile ignition switch is turned off, and wherein the system contains a normally-open circuit connected to the source of electromotive force and a time delay switch which is connected to an audio signal, an improved pressure-operated wsitch for closing the normally-opened circuit comprising, fastening means rigidly secured to a dielectric support element, said fastening means being connected to one side of the electromotive source, a movable contact member positioned adjacent to and normally spaced-apart from a head of said fastening means, said contact member being connected to the opposite side of the electromotive force, resilient dielectric means insulating said movable contact member on the side opposite said fastening means, and said contact member being depressible into engagement with said fastening means to close the normally-operated circuit of the alarm system and activate the time delay switch to energize the audio signal.

2. In a theft alarm system for an automobile wherein a normally-open circuit is connected to a source of electromotive force and is closed by an unauthorized person attempting to operate the automobile, and a time delay switch is then activated to energize an audio signal, an improved non-detectable pressure responsive switch for closing the normally-open circuit comprising, a bolt and nut assembly secured to a floor board of the automobile, said assembly being connected to one side of the electromotive source, a flexible metal contact plate positioned adjacent to and normally spaced-apart from a head of said assembly, resilient dielectric means covering a side of said contact plate opposite the head of said assembly, said contact plate being connected to the opposite side of said electromotive source, and said contact plate being flexible against said bolt assembly to close the normally-open circuit and activate the time delay switch to energize the audio signal.

3. In a theft alarm system for automobiles wherein a normally-open circuit of the theft alarm system is connected to a source of electromotive force and is closed by an unauthorized person attempting to operate the automobile, and a time delay switch is then activated to energize an audio signal, an improved concealed accelerator-operated switch for closing the normally-open circuit comprising, an accelerator rod slidably connected to an accelerator pedal, contact means rigidly connected to one end of said accelerator rod, said contact means being connected to one side of the electromotive source, slide-guide contact means connected to said accelerator pedal, said slide contact means normally being positioned adjacent to and resiliently spaced-apart from said first contact means, said slide-guide contact means being connected to the opposite side of said electromotive source, and said slide-guide contact means on said accelerator pedal being movable into contact with said first contact means to close the normally-open circuit of the alarm system and activate the time delay switch to energize the audio signal.

4. In a theft alarm system as described in claim 3 wherein said accelerator rod is connected to said accelerator pedal by means of a dielectric block element, said first contact means securing said block element to said accelerator rod, a guide pin slidably connected at one end to said slide-guide contact member and at its opposite end to said dielectric block element, said guide pin resiliently being urged outwardly toward said contact guide member to normally retain said slide-guide contact member in spatial relationship to said first contact means.

5. A switch mechanism for an automobile theft alarm system of the class described comprising, an accelerator rod, a switch member contact means secured to said rod, said contact means being connected to one side of said switch member, an accelerator pedal, a slide-guide channel contact member carried by said accelerator pedal, a dielectric block element secured to said accelerator rod by said contact means, a guide pin slidably retained at its head end by said slide-guide channel member, and at its other end by said dielectric block element in spaced-apart relationship to said contact means, resilient means urging said head end outwardly away from said block element to normally retain said slide-guide contact member in spatial relationship with said contact means, said slide-guide member being connected to the opposite side of said switch, and said slide-guide member connected to said accelerator pedal being depressible against said resilient means upon a downward movement of said accelerator pedal to abut said contact means and close said switch member.

References Cited in the file of this patent

UNITED STATES PATENTS

| | | |
|---|---|---|
| 1,229,473 | Keenan | June 12, 1917 |
| 1,688,479 | Wettengel | Oct. 23, 1928 |
| 1,815,206 | Mathews | July 21, 1931 |
| 2,453,903 | Gray | Nov. 16, 1948 |
| 2,610,238 | Jorsch | Sept. 9, 1952 |
| 2,638,517 | Zarski | May 12, 1953 |
| 2,678,978 | Reynolds | May 18, 1954 |
| 2,697,765 | Little | Dec. 21, 1954 |
| 2,782,396 | Marsh | Feb. 19, 1957 |

OTHER REFERENCES

Publication, "Popular Science Monthly," June 1932, page 80.

UNITED STATES PATENT OFFICE

CERTIFICATE OF CORRECTION

Patent No. 2,946,870                                  July 26, 1960

Sam S. Brown

It is hereby certified that error appears in the printed specification of the above numbered patent requiring correction and that the said Letters Patent should read as corrected below.

Column 1, line 69, after "alarm," insert -- such --; column 2, line 70, for "ot the" read -- to the --; column 3, line 73, for "46" read -- 46a --; column 4, line 55, for "wsitch" read -- switch --; line 66, for "normally-operated" read -- normally-opened --.

Signed and sealed this 4th day of April 1961.

(SEAL)
Attest: ERNEST W. SWIDER
Attesting Officer

ARTHUR W. CROCKER
                                                         Acting Commissioner of Patents